(12) United States Patent
Charlebois et al.

(10) Patent No.: US 7,784,038 B2
(45) Date of Patent: Aug. 24, 2010

(54) PATTERN MATCHING AND TRANSFORMATION OF INTERMEDIATE LANGUAGE EXPRESSION TREES

(75) Inventors: Erik P. Charlebois, Pickering (CA); Arie Tal, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1350 days.

(21) Appl. No.: 11/250,021

(22) Filed: Oct. 13, 2005

(65) Prior Publication Data

US 2007/0088697 A1    Apr. 19, 2007

(51) Int. Cl.
G06F 9/45 (2006.01)
(52) U.S. Cl. .................................. 717/144; 717/140
(58) Field of Classification Search .................. None
See application file for complete search history.

(56) References Cited

OTHER PUBLICATIONS

Katalin Hangos et al., "Chapter 5 Tools for Knowledge Representation and Reasoning", 2001, Kluwer academic Publishers, pp. 69-107.*

Mohammad Almulla, "PROLOG Programming in Artificial Intelligence", Aug. 2003, http://web.archive.org/web/20030814093840/http://mcs.sci.kuniv.edu.kw/~almulla/courses/cs459/PROLOG.html#Matching.*

M. Ganapathi, PROLOG Based Retargetable Code Generation, XP009081958. Computer Languages, vol. 14, No. 3, 1989, pp. 193-204, ISSN: 096-0551 Sections 2 to 4.

L. Sterling et al, The Art of PROLOG, MIT Press, XP002428886, 1994, pp. 259-478, ISBN: 0-262-19338-8, Program 24.1.

* cited by examiner

*Primary Examiner*—Wei Y Zhen
*Assistant Examiner*—Lanny Ung
(74) *Attorney, Agent, or Firm*—Yee & Associates, P.C.; Libby Z. Toub (57) ABSTRACT

A method, apparatus, and computer program product are provided by the present invention for a programming framework for easy pattern matching and transformation of intermediate language expression trees. With expression matching and transformation framework (EMTF) of the present invention, pattern matchers may be defined and embedded in a C++ program code in a manner that resembles their intermediate representation. EMTF also provides capabilities for unification, unbinding, transformation, intra-pattern referencing, common operators, creation of pattern objects in a storage pool. Recursive sub-expression matching and recursive transformation are also included.

20 Claims, 8 Drawing Sheets

```
    BU_T *wp = expr->Instruction();           302
    if (wp->buop == USTR) {                    /
      SymbolTableIndex x = WcodeOracle::GetSymbolIndex(wp);
      ExpressionNode *op0 = expr->Operand(0);
      BU_T *wp0 = op0->Instruction();
304 ⟋  if **(wp0->buop == UADD) {
        ExpressionNode *op0_0 = op0->Operand(0);
        ExpressionNode *op0_1 = op0->Operand(1);
        BU_T *wp0_0 = op_0->Instruction();
        BU_T *wp0_1 = op_1->Instruction();
306 ⟋    if (wp0_0->buop == ULOD &&
            WcodeOracle::GetSymbolIndex(wp0_0) == x) {
          Literal *one = op0_1->LiteralValue(compUnit, pool);
308 ⟋      if (one && one->IntegerValue() == 1) {
            // do something with x
          }
        } else if (wp0_1->buop == ULOD &&
310 ⟋       WcodeOracle::GetSymbolIndex(wp0_1) == x) {
          Literal *one = op0_0->LiteralValue(compUnit, pool);
          if (one && one->IntegerValue() == 1) {
            // do something with x
          }
        }
      }
    }
```
⟵ 300

FIG. 3

```
410 ⟋ UnifiableSymbol x;              404      406   408
      Unifiable_int one(1);  ⟋ 412    /        /    /
402 ⟋ if (match(mSTR(x, mADD(mLDC(one), mLOD(x))), expr, compUnit)) {
        // do something with x
      }
```
⟵ 400

FIG. 4

```
    UnifiableSymbol x;
    Unifiable_int one(1);
    if (match(mSTR(x, mADD(mLDC(one), mLOD(x)) ) ||
                     mINC(mLOD(x), one)), expr, compUnit)) {
      // do something with x
    }
```
⟵ 500

FIG. 5

```
void LoopTools::modifyGuard(LoopData &loopData,
                            ExpressionNode *guardExpr)
{
    ...
    UnifiableExpression oldg, newg(guardExpr) :
    transform(mFJP(oldg > > newg) || mTJP(oldg > > mNOT(newg)).
        loopData.mGuardBranch, proc.mPool,
        &fLoopOpt.CompUnit()) ;
}
```

FIG. 6

```
Unifiable_int32 l; Unifiable_int16 f;
transform(mFJP(oldg,1,f) || mTJP(oldg,1,f)) > > mFJP(newg,1,f),....
```

FIG. 7

```
mMatchBranch br;
transform((br=mFJP(oldg) || br=mTJP(oldg)) > >
    mFJP(newg,br.label,br.flags),...
```

FIG. 8

```
UnifiableExpression e;
Unifiable_int k;
UnifiableSymbol v;
if (match(mADD(e=mMPY(mLDC(k), mLOD(v)), e), expr, compUnit)) {
}
```

FIG. 9

```
       Unifiable_int zero(0);
1000   transform(mTJP(mLDC(zero)) >> mNOP(), ...)

1002   Unifiable_int zero(0);
       transform(mFJP(mLDC(!zero)) >> mNOP(), ...)

1004   mMatchBranch br;
       Unifiable_int zero(0);
       transform(br=mFJP(mLDC(zero)) >> mUJP(br.label, br.flags), ...)

1006   mMatchBranch br;
       Unifiable_int zero(0);
       transform(
         (mTJP(mLDC(zero)) ||
         mFJP(mLDC(!zero))) >> mNOP()) ||
         ((br=mTJP(mLDC(!zero))) ||
         (br=mFJP(mLDC(zero)))) >> mUJP(br.label, br.flags), ...)

mMatchBranch br;
       Unifiable_int zero(0);
       if (!transform(
1008     mTJP(mLDC(zero)) >> mNOP() || mFJP(mLDC(zero)) >>
         mNOP(), ...))
       transform(
         br=mTJP(mLDC(!zero))) >> mUJP(br.label, br.flags) ||
1010     br=mFJP(mLDC(zero)))) >> mUJP(br.label, br.flags), ...)
```

*FIG. 10*

```
if (res=transform(mADD(_1, _1) >> mMPY(mIMM(2), _1),
exp, pool, cu)) {
        ... // res contains the transformed expression
}
```

FIGURE 11

```
(ADD                            ; s[iv+2]+1
   (IND s                       ; indirect load of
                                   s[iv+2]
      (ADR
         (LDA s1)                ; base address
         (IMM 0)                 ; displacement
         (ADD                    ; index
            (LOD iv) (IMM 2)
         )
         (IMM 1)                 ; multiplier
      )
   )
   (IMM 1)
)
```

```
(MPY                              ; s[iv+1]*(iv+5)
   (IND s                         ; indirect load of
                                    s[iv+1]
      (ADR
         (LDA s1)                  ; base address
         (IMM 0)                   ; displacement
         (ADD                      ; index
            (LOD iv) (IMM 1)
         )
         (IMM 1)                   ; multiplier
      )
   )
   (ADD
      (LOD iv)
      (IMM 5)
   )
)                                 1200
```

FIGURE 13

```
void replace_LOD_with_LDC(exp, cu)
    {
      UnifiableSymbol v, x;
      if ( match(mLOD(v), exp, cu) && is_constant(v) &&
      get_literal(v, x)) {
         // Generate a LDC of x and substitute it into the
            expression tree.
      } else {
         // Recursively visit child nodes.
      }
    }
```

PATTERN MATCHING AND TRANSFORMATION OF INTERMEDIATE LANGUAGE EXPRESSION TREES

CROSS REFERENCE TO RELATED APPLICATIONS

The present invention is related to applications Ser. No. 10/929,175, entitled "METHOD, SYSTEM AND COMPUTER PROGRAM PRODUCT FOR HIERARCHICAL LOOP OPTIMIZATION OF MACHINE EXECUTABLE CODE", filed on Aug. 30, 2004 and Ser. No. 11/075,091, entitled "METHOD AND APPARATUS FOR A PROGRAMMING FRAMEWORK FOR PATTERN MATCHING AND TRANSFORMATION OF INTERMEDIATE LANGUAGE EXPRESSION TREES", filed on Mar. 8, 2005, both of which are hereby incorporated by reference in their entirety.

BACKGROUND OF THE INVENTION

1. Technical Field

The present invention relates to intermediate language expressions in a compiler of computer system. In particular, the present invention relates to a programming framework for pattern matching and transformation of intermediate language expression trees in a compiler of a computer system.

2. Description of Related Art

Typically, when the source code of a program is compiled using a compiler, the latter parses the source program and generates an intermediate representation for the program. An example of a compiler is an IBM XL compiler and an example of a generated intermediate representation is W-code.

The intermediate representation provides a stack-based representation of expressions in the program.

Pattern matching of intermediate representation is a common technique used to locate predictable statements and expressions and retrieve specific elements, in order to create derived expressions.

Pattern matching of intermediate representation helps to identify a loop that has such induction variable, which adds a constant value to x for every iteration of the loop. Therefore, pattern matching of intermediate representation is a useful technique in loop optimization.

However, most existing pattern matching code is hand crafted for specific patterns. While a generalized pattern matching code or pattern matcher for a given pattern may be written, it is cumbersome for the programmer. In addition, existing pattern matcher code does not provide the capability of easily constructing complex pattern matchers and pattern transformers as objects using grammatical building blocks.

Therefore, the ability to construct and pass these constructed objects as parameters to functions to perform pattern matching and transformation, as well as embedding these constructed objects within a program is desirable. Furthermore, the extensibility of the pattern matcher is desired, such that performance of the compiler may be improved with embedded pattern matchers.

U.S. patent application Ser. Nos. 11/075,091 and 10/929, 175 disclose an expression matching and transformation programming framework (EMTF). These applications disclose a method, apparatus, and computer program product for pattern matching of intermediate representation and transformation of intermediate language expression trees, such that pattern matching can be embedded within a source program. However, the technology so disclosed does not allow nesting searches within one-another, resulting in limited flexibility of the framework to handle more complex patterns.

Therefore, it would be advantageous to have an improved method, apparatus, and computer program product for easy pattern matching of intermediate representation and transformation of intermediate language expression trees, such that pattern matching allows nesting searches and transforms within one-another, and can be embedded within a source program.

SUMMARY OF THE INVENTION

The present invention provides a method, an apparatus, and computer program product for pattern matching and expression transformation of intermediate language expression trees. The present invention allows a pattern to be defined using a generic pattern definition in a computer program. The generic pattern definition may resemble an intermediate representation of the pattern.

If a match statement is detected in the computer program, the pattern is matched with an input expression. The match statement may include a generic pattern definition, an input expression, and a compilation unit object, wherein the generic pattern definition is defined using a plurality of objects. If a transform statement is detected in the computer program, the pattern is matched with an input expression, and an output expression is generated.

The generic pattern definition of the present invention may include a unifiable variable. The present invention determines if the unifiable variable is bound. If the unifiable variable is bound, the value of the unifiable variable is compared to a value of the input expression. However, if the unifiable variable is not bound, the present invention binds the unifiable variable to a value of the input expression. If the present invention determines that a bound unifiable variable fails to match the input expression, the present invention backtracks to unbind the bound unifiable variable.

By backtracking, the present invention determines an age of the unifiable variable, which indicates an order of binding, and compares the age to a predefined age barrier. The age barrier indicates a point to which an algorithm backtracks. If the age is greater than the age barrier, the unifiable variable is unbound by resetting the value of the unifiable variable.

The present invention further determines if the transform statement includes a derivation pattern, which includes a derivation operator, a match pattern, and a generate pattern. If the transform statement does not include a derivation pattern, a copy of the input expression is generated as an output expression. The output expression includes at least one transformed sub-pattern of the pattern in the generic pattern definition.

If the transform statement includes a derivation pattern, the input expression is matched with the match pattern along with any grammatical objects and an output expression is generated for all grammatical objects using the generate pattern. However, if the transform statement includes a derivation pattern, an output expression is generated from the matched pattern with a plurality of objects that are bound to the input expression during the matching step.

If the pattern comprises an assignment operator indicating a reference to a part of the pattern, upon detecting an assignment operator in the statement, a reference is created for the part of the pattern. If the created reference is detected, the present invention refers to the part of the pattern.

In the case of a pattern for a match statement, the pattern may also comprise a recursive sub-expression match. Where the statement is a transform, the pattern may include a recursive transform for directing a recursive transformation.

Preferred embodiments of the present invention have pattern matchers and transformers preferably created as C++ objects.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1, 16:
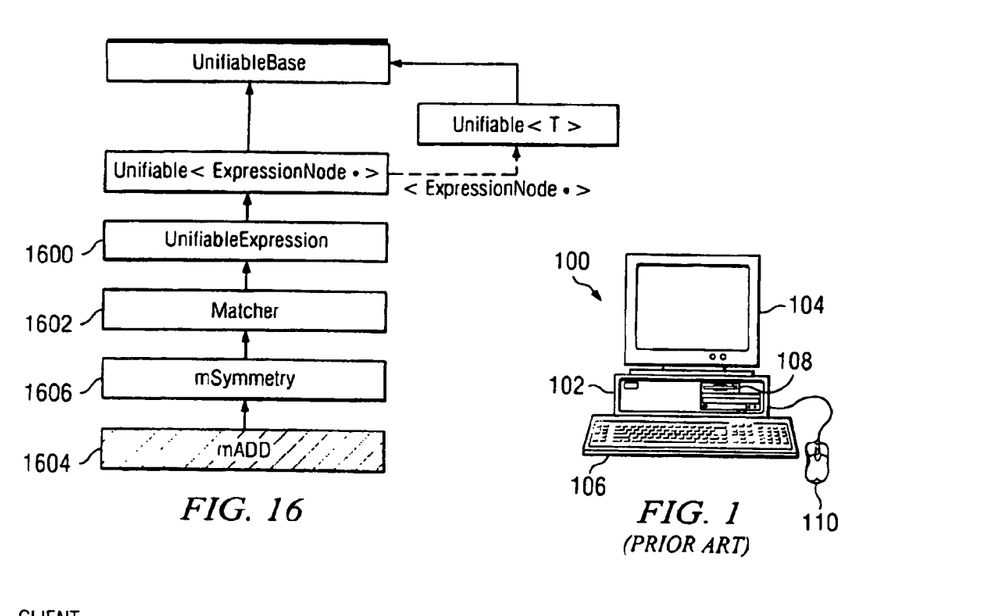
FIG. 1 is a pictorial representation of a data processing system in which the present invention may be implemented in accordance with a preferred embodiment of the present invention.
FIG. 16 is a diagram illustrating exemplary W-code constructs implementation in EMTF is depicted in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
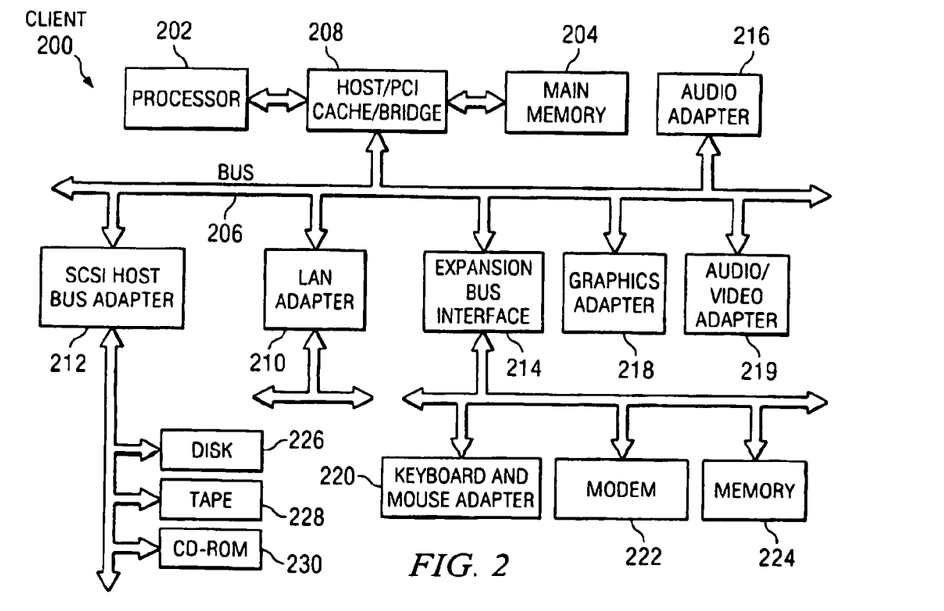
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, an apparatus, and computer instructions for pattern matching and transformation of intermediate representation language expression trees. In a preferred embodiment, the present invention provides an expression matching and transformation programming framework (EMTF) for simplifying the task of defining and embedding general intermediate language pattern matchers or transformers. A pattern matcher matches an input expression with a given pattern. In the prior art, each embedded pattern matcher is hand coded for a specific pattern.

With EMTF of the present invention, pattern matchers and transformers are preferably created as C++ objects. These objects may be stored, passed to functions, used, and reused. This allows functions in the program to accept more general patterns. For example, a function such as searchAndTransformPattern may recursively apply a given pattern transformation to a given input expression. With the prior art, a programmer would have to implement the same algorithm for each and every pattern that is applied to the expression. However, with EMTF, since patterns may be defined using C++ objects, the same pattern may be applied recursively without the need to repeat the algorithm. In addition, since the patterns are defined in C++ in a manner resembling their intermediate representation, the program code is now more readable and easily extensible.

Figure 3:
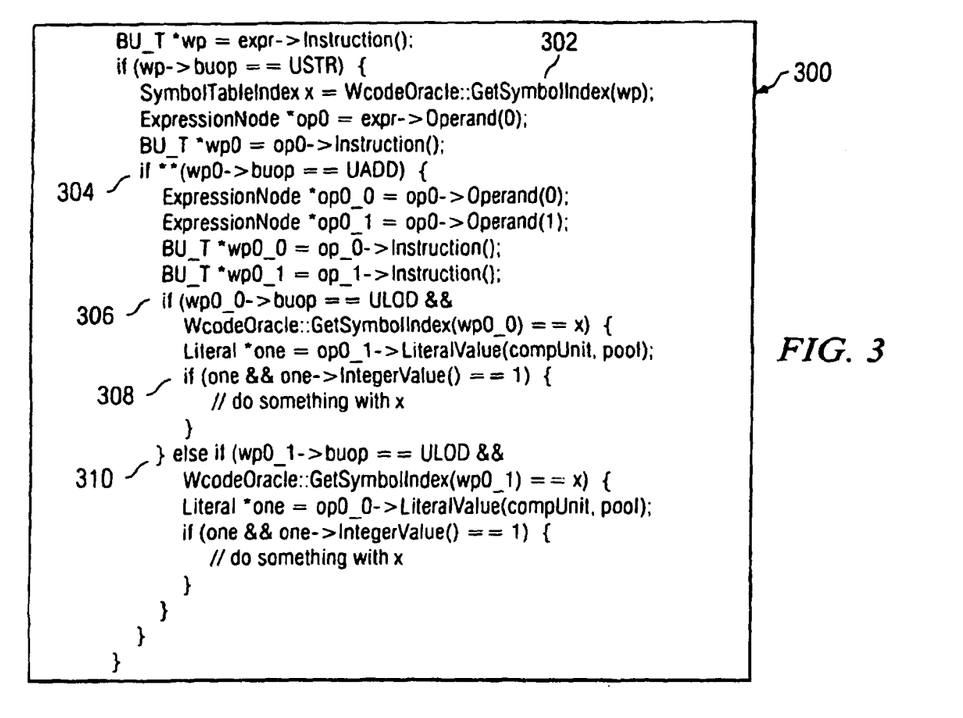
FIG. 3 is a diagram illustrating a known embedded pattern matcher in accordance with the prior art.

Turning now to FIG. 3, a diagram illustrating a known pattern matcher in accordance with the prior art. As shown in FIG. 3, a programmer has to hardcode a pattern matcher, such as pattern matcher 300, to match an input expression with a pattern of 'x=x+1', which is expressed in intermediate representation as (STR x (ADD (LDC 1)(LOD x))).

Pattern matcher 300 first determines whether the expression is a store operation 'STR' 301. Then, the symbol being stored to, in this case 'x', is retrieved from a symbol table 302. After 'x' is retrieved, the pattern matcher determines whether sub-expression 'wp0' is an 'ADD' operation.

If the expression is an 'ADD' expression and it is the same 'x', it divides the two operands into two expression nodes, expression node wp0_0 and wp0_1. For expression node wp0_0, pattern matcher 300 determines if the operand is a 'LOD' operation of 'x' 306. If the operand is a 'LOD' operation of 'x', then it determines if the second expression node, wp0_1, is a 'LDC' operation and if the constant getting loaded is equal to an integer with a value of '1' 308. If the constant loaded is equal to '1', then do something with 'x'. For expression node wp0_1, pattern matcher 300 repeats the same process as expression wp0_0 310.

Figure 4:
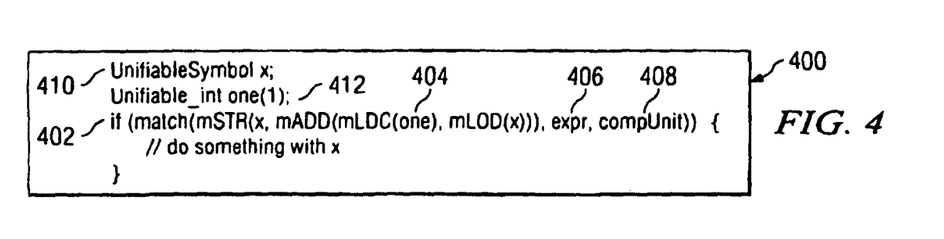
FIG. 4 is a diagram illustrating exemplary pattern matching using expression matching and transformation programming framework (EMTF) in accordance with the present invention.

Turning now to FIG. 4, a diagram illustrating exemplary pattern matching using expression matching and transformation programming framework (EMTF) is depicted in accordance with the present invention. As shown in FIG. 4, pattern matcher 400 implemented using EMTF is much simpler.

In this example, pattern matcher 400 includes a definition of a unifiable symbol of 'x', and a unifiable integer of '1'. Instead of implementing the entire algorithm, like pattern matcher 300 in FIG. 3, pattern matcher 400 includes only a single 'match' statement 402. 'match' statement 402 takes 3 input parameters: pattern 404, input expression 406, and a compilation unit object 408. Pattern 404 defines a store operation of 'x' using the result of an addition operation, which adds a loaded constant value of 'one' to a loaded symbol of 'x'.

Pattern 404 is preferably defined using C++ objects, such as mSTR for STR, mADD for ADD, mLDC for LDC, and mLOD, for LOD. Thus, pattern 404 resembles its intermediate representation. This makes the program code more readable and extensible. In addition to 'match' statement 402, pattern matcher 400 may include other functions, such as generate and transform, which drives pattern matcher 400 to generate an output expression and transform the input expression. Transform simply performs pattern matching on the input expression before generating an output expression for each object in the pattern.

Figure 5:
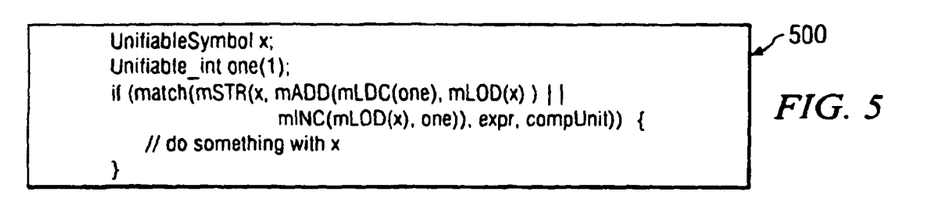
FIG. 5 is a diagram illustrating an extended pattern matching using expression matching and transformation programming framework (EMTF) in accordance with the present invention.

Furthermore, pattern 404 may also be extended to include an additional way of increasing the value of a variable by 1. Turning now to FIG. 5, a diagram illustrating an extended pattern matching using expression matching and transformation programming framework (EMTF) is depicted in accordance with the present invention. As shown in FIG. 5, pattern 500 is similar to pattern 404 in FIG. 4, except that an 'OR' operation (represented by symbol '||') is added to 'OR' the addition operation and an 'INC' operation, which increments a loaded symbol of 'x' by 'one'. Thus, with pattern matcher provided by EMTF of the present invention, definition of patterns is simplified.

In addition to simplified pattern matching and transformation, EMTF enables retrieval of elements from input by leveraging unification. Unification is a technique that compares the value of a bound variable with the input if the variable is bound to some value. However, if the variable is not bound, unification binds the input value to the variable. In most cases, the value of a variable is unknown prior to pattern matching the input expression. However, in some cases like bumper statements, the value of the variable may be known prior to pattern matching. A bumper statement is a statement that increases the induction variable by a constant value, for example, x=x+1. EMTF incorporates unification, which enables programmers to specify the known variable value as part of the pattern.

Turning back to FIG. 4, pattern matcher 400 includes two unification variable, unification symbol 'x' 410, which has no initial binding, and unification integer 'one' 412, which has a constant value of '1'. Since 'x' is unbound, the pattern matcher will bind 'x' to the value of the input. Since 'one' is bound to '1', the pattern matcher will make a comparison of '1' to the input.

In FIG. 4, when mSTR (x, mADD (mLDC(one), mLOD (x))) is matched, 'x' would be bound to the symbol used in the STR operation, and then compared to the symbol used in the LOD operation. By the time the pattern matcher tries to match mLOD(x), x has already been bound. Therefore, if the STR and LOD operations refer to different symbols, pattern matcher fails to match the pattern against the input expression.

Based on the above failure of matching a pattern, EMTF provides unbinding capability to unbind a variable. Suppose that a pattern has an intermediate representation of (ADD e (LOD iv)). A pattern matcher matches this pattern with an input expression of (ADD (LOD civ) (LDC 1)). Using EMTF, the pattern description becomes mADD (e, mLOD (iv)), where e is defined as a UnifiableExpression and iv is defined as a UnifiableSymbol.

When the pattern is matched from left to right, the following procedure occurs:

Matched ADD
    Binding e with (LOD civ)
    Failed to match (LOD iv) with (LDC 1)
    Unbinding e so that e can be bound to second operand instead, since ADD is a commutative operator
    Binding e with (LDC 1)
        Matched LOD
            Binding iv with civ
            Done In the procedure above, LOD iv cannot be bound with LDC 1, since they are different operations. In the first attempt, it is possible to bind e with LOD civ, since e is not as restrictive as LOD iv. But once e is bound, LOD iv may not be bound with LOD civ and since LOD iv cannot be bound to LDC 1, backtracking is necessary to unbind e such that the pattern can be successfully matched.

Therefore, unbinding is a necessity for this model when backtracking. Conversely, backtracking introduces additional complexity that requires unbinding. For example, in cases where backtracking is employed in multiple levels, not all the bound variables should be unbound, because some of the bound variables may have been bound prior to the backtracking point, which means they should remain bound. Therefore, in EMTF, every binding is labeled with an age, which indicates the order of binding. Earlier bindings have a younger or smaller age then later bindings. During backtracking, an age barrier may be set to indicate a point to which the algorithm backtracks. Thus, any binding that has a higher or older age than the age barrier is unbound. In this way, using EMTF unbinding feature, the pattern matcher may control the amount of backtracking to be performed when matching a pattern.

Figure 6:
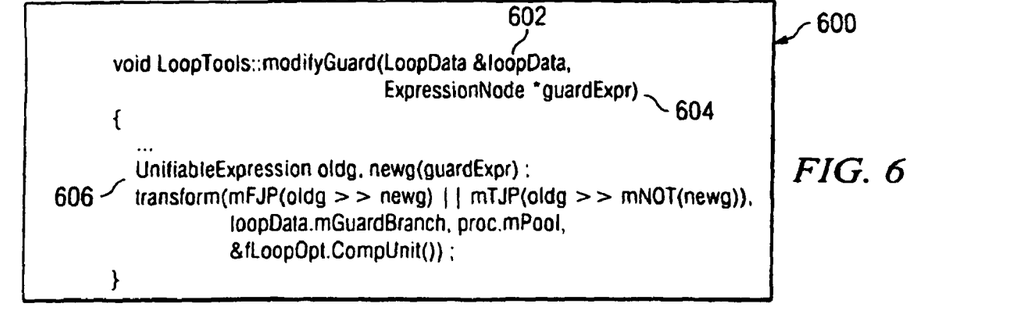
FIG. 6 is a diagram illustrating an exemplary transformation of input expressions using expression matching and transformation programming framework (EMTF) in accordance with the present invention.

As part of EMTF, transformation may be performed to transform input expressions into derived expressions. Turning now to FIG. 6, a diagram illustrating an exemplary transformation of input expressions using expression matching and transformation programming framework (EMTF) is depicted in accordance with the present invention. As shown in FIG. 6, modifyguard method 600 takes two input parameters: loopData 602 and input expression guardExpr 604.

ModifyGuard method 600 includes transform statement 606, which matches and generates an output expression for input expression guardExpr 604. Assuming that new guard (newg) expression is a negative check, meaning that the condition evaluates to a FALSE then goto label, when a TJP or true jump is encountered, a NOT is generated around the new guard expression.

In this example, transform statement 606 indicates that if an FJP or false jump is encountered, the old guard expression (oldg) is replaced with a new guardExpr expression. However, if a TJP is encountered, the old expression is replaced with a NOT guardExpr expression.

Figure 7:
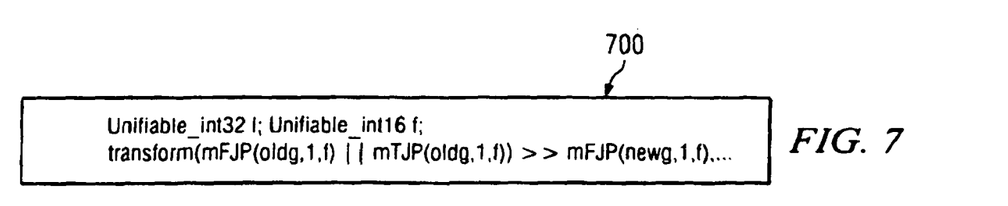
FIG. 7 is a diagram illustrating an exemplary transformation of input expressions with flag and label information using expression matching and transformation programming framework (EMTF) in accordance with the present invention.

Turning now to FIG. 7, a diagram illustrating an exemplary transformation of input expressions with flag and label information using expression matching and transformation programming framework (EMTF) is depicted in accordance with the present invention. As shown in FIG. 7, transform statement 700 indicates that if flag and label information is managed by the pattern, the flag and label is also passed to the generated pattern.

Thus, if the old guard (oldg) expression includes a flag and label, which identifies the specific instructions of the expression, the flag and label may be passed to the new guard expression (newg).

Figure 8:
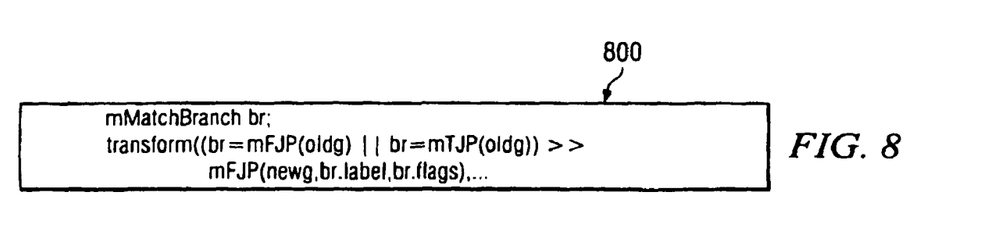
FIG. 8 is a diagram illustrating an exemplary intra-pattern referencing using expression matching and transformation programming framework (EMTF) in accordance with the present invention.

In addition to transformation, it may be necessary sometimes for patterns to refer to other parts of the same pattern. EMTF provides an assignment operation (=), which is used to create such reference. Turning now to FIG. 8, a diagram illustrating an exemplary intra-pattern referencing using expression matching and transformation programming framework (EMTF) is depicted in accordance with the present invention.

As shown in FIG. 8, mMatchBranch 800 is a super class of all branch patterns in EMTF, including false jump (FJP) and true jump (TJP) patterns. Thus, mMatchBranch manages the flag and label information for the branch patterns.

By using the assignment (=) operator, br may be defined to unify with the FJP pattern if the input contains an FJP branch, or with the TJP pattern if the input contains a TJP branch. In this example, br is defined to unify FJP and TJP with the input to create a new FJP branch that references br's label and flag information. Assignment translates to unification, which means that if br is bound to a value, the assignment operation becomes a comparison.

Figure 9:
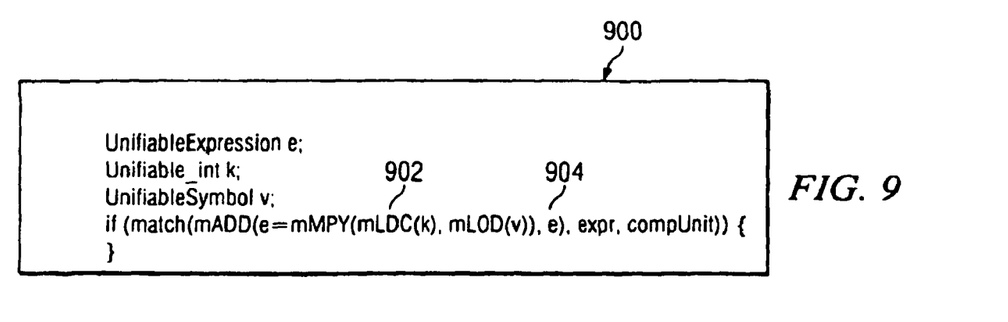
FIG. 9 is a diagram illustrating an exemplary short form definition using intra-pattern referencing in accordance with the present invention.

Turning now to FIG. 9, a diagram illustrating an exemplary short form definition using intra-pattern referencing is depicted in accordance with the present invention. As shown in FIG. 9, a short form is defined using assignment (=) operator. In this example, pattern matcher 900 tries to match expression:

ADD (MPY (LDC k)(LOD v)) (MPY (LDC k)(LOD v)))

Using the assignment operator, e is assigned to expression (MPY (LDC k)(LOD v)) 902. It is noted that since mADD handles the comutativeness of the ADD operator, if the expression mMPY (mLDC(k), mLOD(v)) does not match with the input, e will not be bound. Thus, the second e argument 904 may be matched with any expression that is the first argument of ADD. However, the assignment operator (=) translates to unification, therefore, the expression e was bound to also match mMPY (mLDC (k), mLOD(v)).

Figure 10:
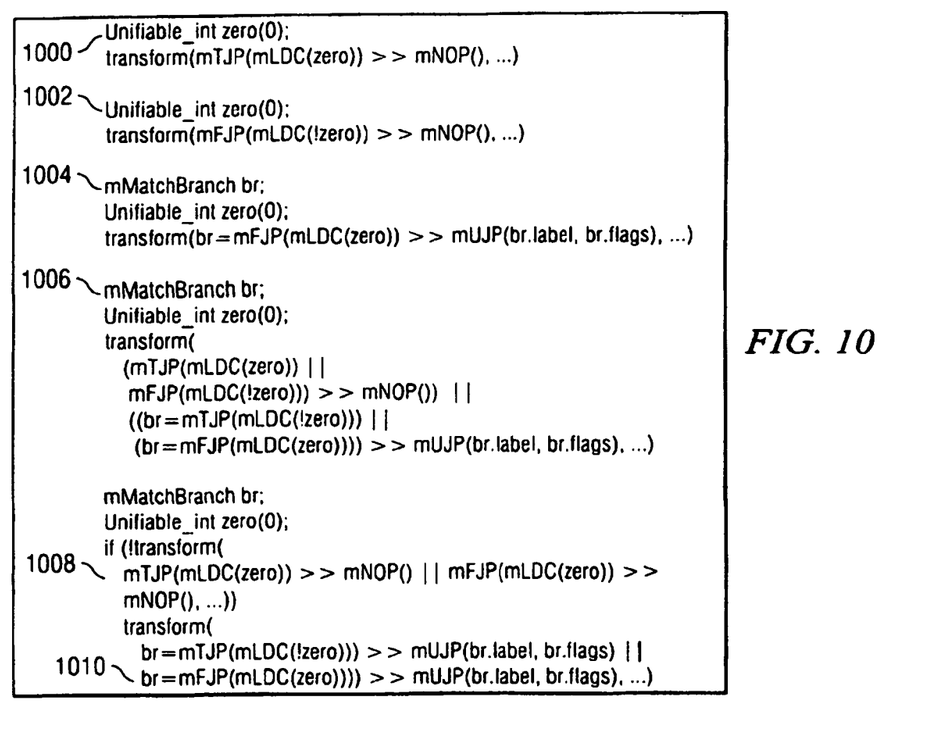
FIG. 10 is a diagram illustrating an exemplary implementation of branch folding using expression matching and transformation programming framework (EMTF) in accordance with the present invention.

Turning now to FIG. 10, a diagram illustrating an exemplary implementation of branch folding using expression matching and transformation programming framework (EMTF) is depicted in accordance with the present invention. As shown in FIG. 10, conditional branches where the condition folds to FALSE are transformed into NOPs. Thus, transform statement 1000 is used to transform a TJP branch to a NOP if the condition folds to a value of 'zero'.

However, for a FJP branch, if the condition folds to any value other than 'zero', the FJP branch should be transformed to a NOP. Thus, as illustrated by transform statement 1002, a not (!) operator is used to create a !zero pattern. If the zero pattern unifies the input, the pattern fails to match. If the zero pattern fails to unify with the input, the pattern matches successfully.

With EMTF, transformation may also be performed on the conditional branches where the conditions fold to TRUE into UJPs. UJP is always jump. As shown in FIG. 10, transform statement 1004 transform FJP branch into a UJP branch if zero pattern unifies with the input.

With the OR (||) operator, transform statements 1000, 1002, and 1004 may be combined into a single transformation pattern as illustrated by transform statement 1006. However, since some compilers may not handle constructors wrapped around in parenthesis well, two transformation patterns may be used, as illustrated by transform statements 1008 and 1010.

Figure 15:
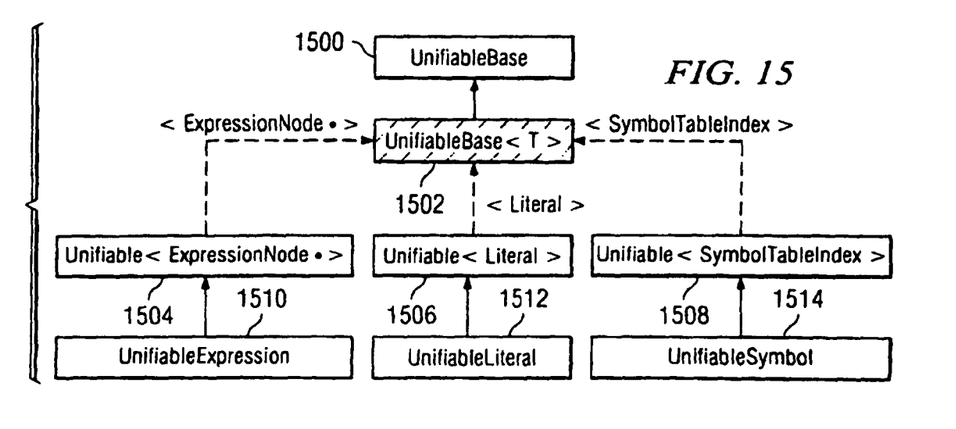
FIG. 15 is a diagram illustrating an exemplary implementation of EMTF depicted in accordance with a preferred embodiment of the present invention.

Turning now to FIG. 15, a diagram illustrating an exemplary implementation of EMTF is depicted in accordance with a preferred embodiment of the present invention. As shown in FIG. 15, EMTF includes a super class, Unifiable-Base 1500, which defines the basic unification algorithm and gives every object a data type and length attributes. Unifiable template class 1502 adds the value attribute based on a typed template, including Unifiable<ExpressionNode*> 1504, Unifiable<Literal> 1506, and Unifiable<SymbolTable-Index> 1508. UnifiableExpression 1510, UnifiableLiteral 1512, and UnifiableSymbol 1514 are concrete implementation of Unifiable<ExpressionNode*> 1504, Unifiable<Literal> 1506, and Unifiable<SymbolTable-Index> 1508.

Other subclasses may be added in EMTF to provide even more concrete implementation. For example, a subclass may be added to UnifiableLiteral 1512 to perform a search of integer that is less than a value of '10'. In this way, at compile time, the value of the variable may be evaluated, which helps in unification. By adding more subclasses for special purposes, more constructs are allowed and backtracking capability is thus expanded. In addition, a symbol mapper class may be added to EMTF that utilizes UnifiableSymbol to map one symbol to another symbol.

Turning now to FIG. 16, a diagram illustrating exemplary W-code constructs implementation in EMTF is depicted in accordance with a preferred embodiment of the present invention. As shown in FIG. 16, UnifiableExpression 1600 is similar to UnifiableExpression 1510 in FIG. 15. Pattern matcher 1602 may be implemented by inheriting from UnifiableExpression 1600.

In order to implement a W-code construct, such as mADD 1604 in EMTF, mSymmetry class 1606 may be used, since mADD 1604 is commutative, which is a property handled by mSymmetry class 1606. In addition, EMTF may be extended to include other W-code constructions. For example, a mSymbol class may be added to examine a bit vector of a symbol to determine if that symbol is allowed. This provides a fast search of a symbol by looking at whether the symbol is a member of the bit vector and loads the symbol that is within the set of symbols if the bit vector is equal to '1'.

In summary, EMTF builds on the idea of a general parser that comprises a set of parsing rules or a grammar. The set of parsing rules are combined into single big parser for a language. The parser may then handle each parsing rule in its own parsing scheme, using a backtracking "Recursive Descent" parsing algorithm.

EMTF divides intermediate representation parsing into separate parsing rules, with each intermediate representation operator having its own rule. When defining a pattern, the separate rules are combined into a grammar. Since all rules have been predefined in EMTF, the separate rules maybe combined to form any grammar. This gives the flexibility of defining less common expressions, since each grammar identifies a family of expressions. During pattern matching, the family of expressions defined by the pattern's grammar is matched against the input expression to see if it belongs to the family of expressions.

With intermediate representation expressions already defined as expression trees, defining a grammar for a tree-based expression is easy, since EMTF pattern is a lot like expression trees. By wrapping every little parser in EMTF as an object, and having intra-reference capability for each object to refer to each other, the objects may be combined together into a parser for the pattern. Most of the operators in EMTF, including the assignment and derivation, actually construct specialized objects. In this way, decision relating to the operators may be delayed until after the input expression is matched.

With the unification capability of EMTF, elements may be retrieved and compared from the input. EMTF also provides transformation capability to match the pattern using a match pattern, and generate an output expression using a generate pattern. Most objects simply output the expression that they were bound to during pattern matching. However, specialized objects, such as derivation, will ask the derivation pattern to generate the result instead of the match pattern. Thus, giving a pattern p>>t, a match driver on the derivation object will use the p pattern for matching and a generate driver on the derivation object will use the t pattern for generating the output expression.

For any sub-pattern that does not include a derivation pattern, a copy of the input sub-expression is generated. For example, for a transform statement of mSTR(x, mADD (mLOD(x))>>mLDC(0), e), inpExpr, & CompUnit), mLOD (x)>>mLDC(0) is a generate sub-pattern that generates a (LDC 0) sub-expression if the pattern matches. However, the rest of the pattern generates a copy of whatever it matches against. Thus, the result will be a new STR expression referencing x and a new ADD sub-expression referencing a new (LDC 0) sub-expression and a copy of e sub-expression.

In order to avoid using a lot of empty (temporary) unifiable variables for matching patterns, construct a UnifiableExpression object (where v is declared earlier as a unifiable variable) as indicated in the following example:

```
if (match(mIND(v, UnifiableExpression( )), exp,
   cu)){
      ... // do something with v
}
```

Figure 11:
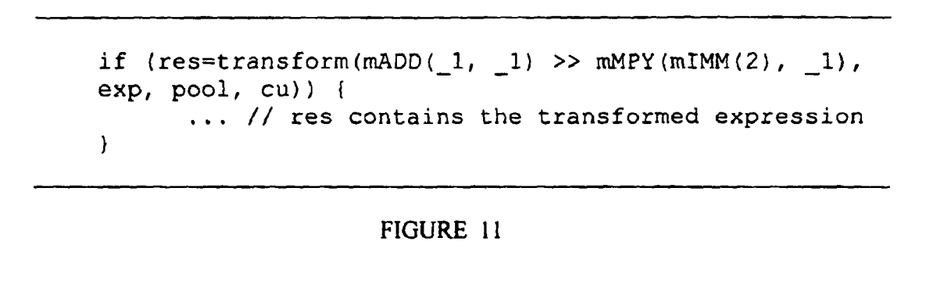
FIG. 11 is a diagram illustrating exemplary W-code constructs implementation in EMTF depicted in accordance with a preferred embodiment of the present invention.

Note however, if the same sub-expression must be matched in multiple locations, an identifier would still need to be declared and used. To address this, in a preferred embodiment, the _n form is used for temporary variables. Temporary variables are preferably managed in EMTF using an EMTF-Context object, that is created by the top-level driver (the names "driver" is used to refer to the match( ), transform( ), and generate( ) functions). But these are not declared. Therefore, an exemplary description of an example would is shown in FIG. 11 (for a symmetric ADD that is converted to multiply by 2).

Implementation wise, __1 is preferably a real class that interacts with the EMTFContext created by the transform( ) driver to construct a temporary variable that would be used by the pattern given to the driver, and every use of __1 in the pattern would reference that same temporary variable.

Since temporary variables are only alive within an EMTF-Context that lives in a single driver call, there is no need to reset (or unbind) them before every call to match/transform/etc. Ordinarily, it would have been necessary to unbind any temporary variable, in order to use that same temporary variable in a successive match or transform operation.

The intra-pattern referencing method discussed above can be used to unify a temporary variable with a specific pattern.

One of the great advantages of EMTF discussed above is the ability to pass patterns as objects to functions. That ability in that context may be used to implement a recursive search of a pattern within an expression tree. However, an inherent limitation is that a single recursive search may be done within an expression tree, i.e. look for a single pattern within the entire expression tree. For example:

```
if (searchPattern(mLOD(iv), exp, cu)) {
    ... // a load of the induction variable iv
        somewhere within the expression exp
        is found
}
```

However, if it is desired to search for say a (DIV . . . ) subexpression within exp, that contains a LOD of the iv, one would need to code that into searching every occurence of DIV in the sub expression, and then applying the above pattern on every result. Besides having to code that, it would be hard to embed that easily within other patterns.

This invention includes a feature which makes use of a recursive sub-expression operator, the >=operator. The >=operator is defined as: x>=y (the recursive sub-expression match) is TRUE if and only if, there is a sub expression of x (or x itself) that matches the pattern y.

The motivation for using the >=(bigger or equal) symbol for this is that if x>=y, then the sub-expression matched by y is contained within the sub-expression matched by x, or in other words the sub-expression matched by x is "bigger or equal" than the sub-expression matched by y.

The above example, coded using the new operator would look like (__1 being a temporary variable):

```
if (match(__1 >= mLOD(iv), exp, cu)) {
    ... // a load of the induction variable
        somewhere within the expression exp
        is found
}
```

The utility of this operator is seen when used inside complex patterns. Matching an expression that contains some (DIV . . . ) subexpression with a reference to the induction variable (somewhere inside it) would be described as

```
if (match(__1 >= (mDIV(__2,__3) >= mLOD(iv)), exp,
    cu)) {
    ... // a reference to the induction variable
        inside some divide operation within
        exp is found
}
```

Another example of the power of this operator is that it can be applied anywhere within a pattern, for example, to search for the previous pattern within a STO (indirect store) operation, but only within the expression being stored and disallow any references to the induction variable (iv) in the address of the indirect store, the following pattern could be used:

```
if (match(mSTO(__s1, !(__1 >= mLOD(iv)), __2 >=
    (mDIV(__3,__4) >= mLOD(iv))), exp, cu)) {
    ... // a reference to the induction variable
        inside some divide operation within
        the second operand is found and there
        are no references to the induction
        variable within the first operand
}
```

The pattern above looks for STO at the root of the tree, with any symbol (__s1).

The pattern __1>=mLOD(iv) will succeed in matching, if the first operand has a reference to the induction variable. However, the ! operator may be used on that pattern to make it succeed only if there are no references to the induction variable.

Finally, the pattern from the previous example may be used on the second operand, to look for a DIV containing a reference to the induction variable.

Figure 12:
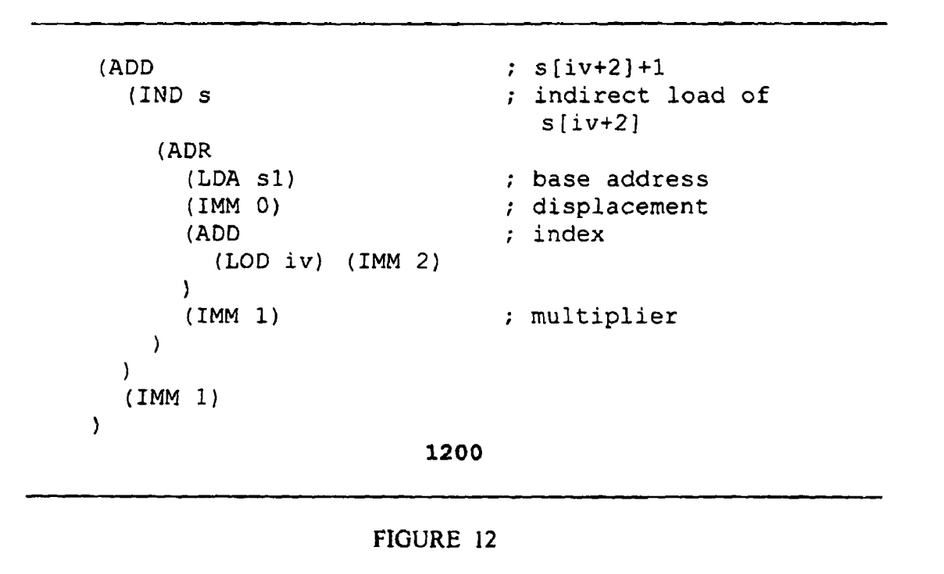
FIG. 12 is a diagram illustrating an exemplary intermediate representation.

In some cases, it is needed to search for the existence of a sub-expression within an expression tree, while ignoring certain parts of that expression tree, e.g. to search for references to the induction variable that are not within an indirect load as shown in the intermediate representation expression 1200 (the comments supplied for clarity and not precision) of FIG. 12. This expression 1200 contains a load of the induction variable, but that load is part of the address sub-expression (ADR) of an indirect load. Searching for a reference to the iv in the expression tree above, while ignoring any references that are within indirect loads, would require that expression tree to be "pruned" where an indirect load is matched. Pruning can also improve compile-time performance, if undesirable sections of the expression tree can be avoided instead of searching them and ruling out results.

Figure 13:
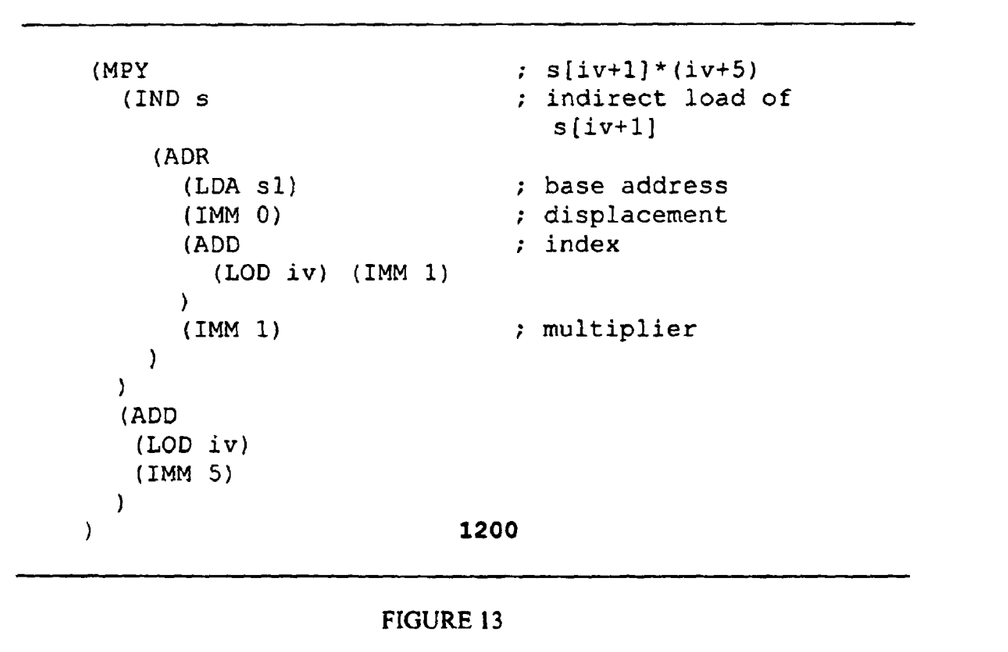
FIG. 13 is a diagram illustrating a further exemplary intermediate representation.

The intermediate representation expression 1300 in FIG. 13 is an example where the expression tree contains a load of the induction variable that is not within an indirect load. To do that, the ability to prune the expression tree for the search operation is needed (pruning was introduced in searchAndTransform pattern) earlier. For that purpose, the "not within" search-refinement operator, that is defined as follows: x>=(y^=z) is TRUE if and only if the sub-expression matched by x contains some sub-expression matched by y, that is not contained within a sub-expression of x that is matched by z.

The above example expression 1300, coded using the new operator would look like:

```
if (match(__1 >= (mLOD(iv) ^= mIND(__s1, __2)) ,
   exp, cu)) {
       ... // a load of the induction variable
           somewhere within the expression exp
           that is not within an indirect load is
           found
}
```

Specializing the above pattern even further to looking for references to "iv" that are not within IND sub-expressions that contain a reference to "oiv", the following code can be used:

```
if (match(__1 >= (mLOD(iv) ^= mIND(__s1, !(__2 >=
   mLOD(oiv))) , exp, cu)) {
       ... // a load of the induction variable
           somewhere within the expression exp
           that is not within an indirect load
           that contain a load of "oiv"
}
```

Note that the pruning pattern mIND(_s1, !(__2>=MLOD (oiv)) matches with expressions that are indirect loads whose address expression has no loads of "oiv". Another >=operator within a pruning pattern is used.

The ability to pass patterns as objects in a searchAndTransformPattern ( ) function has been discussed earlier, e.g. to do search-replace like operations on expression trees. However, a limitation of this is that a single recursive search-transform within an expression tree may be done, i.e. do a single pattern transformation within an entire expression tree. For example:

```
if (res=searchAndTransformPattern(mLOD(iv) >>
   mADD(mIMM(1), mLOD(iv)), exp, pool, cu)) {
       ... // res is a "copy" of exp where
           all the loads of the induction
           variable were converted to 1+load
           (e.g. when unrolling a loop)
}
```

However, if it is needed to apply the above transformation only within the stored part of an indirect store operation, one must first match that pattern and apply that transformation on the matched operand, etc.

To address this, the recursive transformation operator x>>=y is defined as follows:

if x is matched, apply the pattern transformation y recursively on the matched sub-expression.

The above example, coded using the new recursive transformation operator, would look like:

```
if (res=transform(__1 >>= (mLOD(iv) >>
   mADD(mIMM(1), mLOD(iv))), exp, pool, cu)) {
       ... // res is a "copy" of exp where
           all the loads of the induction
           variable were converted to 1+load
           (e.g. when unrolling a loop)
}
```

Using the >>=operator, and applying it to the extended example, the following pattern would be used:

```
if (res=transform(mSTO(__s1, __1, __2 >>= (mLOD(iv)
   >> mADD(mIMM(1), mLOD(iv)))), exp, pool, cu)) {
       ... // convert all the loads of the
           induction variable to 1+load only in
           the stored part of an indirect store
           expression
}
```

To apply the pattern to the entire expression (but only to an STO expression), a slightly modified pattern would be used:

```
if (res=transform(mSTO(__s1, __1, __2) >>= (mLOD(iv)
   >> mADD(mIMM(1), mLOD(iv))), exp, pool, cu)) {
       ... // convert all the loads of the
           induction variable to 1+load in an
           indirect store
}
```

Note that in this above example, it is necessary to only delete one character and add one character to the pattern (remove a closing ')' and add it after __2)

Similarly to its definition for recursive search, define the ^=operator for recursive transform as follows:

x>>=(y ^=z) is defined as: if x is matched, apply the pattern transformation y recursively on all the sub-expressions of the expression matched by x, ignoring any sub-expressions of x that are matched by z (or any of their sub-expressions). In other words, transform y everywhere in x that is not within a sub-expression matching z.

For example, to transform the loads of the induction variable iv to loads of a new variable niv, everywhere in expression exp, except in indirect loads of variable q, the following code may be used:

```
if (res=transform(__1 >>= (mLOD(iv >> niv) ^=
   mIND(q, __2)), exp, pool, cu)) {
       ... // convert all the loads of the
           induction variable to loads of a niv
           everywhere except within indirect
           loads of q
}
```

Note that mLOD(iv >>niv) would transform a load of iv to a load of niv. The transformation would be done everywhere in __1 except for within indirect loads of q.

Since the definition of the x>>=y operator is that x can be any pattern, this of course means that one can apply the store transformation on expression trees that recursively match some pattern. For example the pattern:

```
if (res=transform(!(__1 >= mLOD(oiv)) >>=
   (mLOD(iv) >> mADD(mIMM(1), mLOD (iv))), exp, pool,
   cu)) {
       ... // convert all the loads of the
           induction variable to 1+load in an
           expression that has no references to
           the outer induction variable
}
``` will match expressions that have no loads of the symbol oiv (e.g. outer induction variable), in a manner similar to what was demonstrated in the previous example of the >=operator. If such an expression matches, then the recursive transformation of adding 1 to iv would be applied on the entire expression.

In a manner similar to the use of the || (OR) operator introduced earlier, the && (AND) operator is defined as follows:

x && y is true if and only if both x and y unify with the input expression.

One example of how this can be used is as follows: if it is desired to match expressions that contain no indirect load, one would use the following:

```
if (match(!(_1 >= mIND(_s1, _2)) , exp, cu)) {
    ... // found an expression that contains no
            indirect loads
}
```

However, if an expression should be matched that contains an indirect load that does not have a reference to the induction variable, one would need to use the following:

```
if (match(_1 >= (_2=mIND(_s1, _2) && !(_2 >=
mLOD(iv))) , exp, cu)) {
    ... // found an expression that contains an
            indirect load with no reference to iv
}
```

Note that the pattern _1>=(!(mIND(_s1, _2)>=mLOD(iv))) would not be sufficient here, since the pattern !(mIND(_s1, _2)>=mLOD(iv)) would succeed in matching with every indirect load that does not contain a reference to the induction variable but also with any expression that is not an indirect load. The && operator is used to force the matched pattern to be both and indirect load and contain no references to the induction variable.

The safety or applicability of a transformation generally depends on more than just syntactic information. For example, to search for loads of constant data and replace them with loads of literal constants, each symbol being loaded must be checked to see whether it has a constant value and, if so, a literal for the constant value needs to be created or retrieved. The load of the symbol can then be replaced with the load of the constant.

Figure 14:
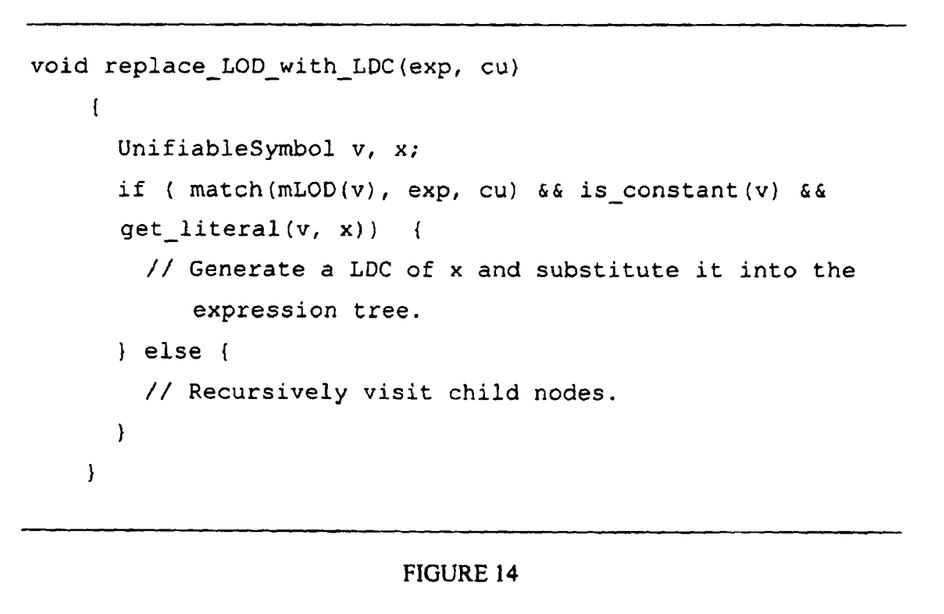
FIG. 14 is a diagram illustrating exemplary W-code constructs implementation in EMTF is depicted in accordance with a preferred embodiment of the present invention.

Since the semantic checks cannot be embedded in the pattern, a recursive searchAndTransformPattern operation cannot be used. Instead, one must resort to a recursive traversal function that performs a discrete match, semantic check and generate on each expression tree node: FIG. 14.

To overcome this limitation, introduce preferably a forwarding functor class mFunctor, which binds parameters to a function pointer at construction and store the command for later execution (for example, using the classic C++ functor pattern). EMTF executes the functor via the match method, which in turn executes the wrapped function call. The return value of the function is the return value of the functor.

Using this pattern, the above example becomes:

```
if (res=transform(_1 >>= ((mLOD(_s1) &&
mFunctor(is_constant, _s1) &&
mFunctor(get_literal, _s1, _l1)) >> mLDC (_l1)),
exp, pool, cu) {
```

-continued

```
    ... // transformed all the loads of symbols
            that were detected as constants into
            loads of literal constants
}
```

The transformation can now be expressed in a single statement and does not require the declaration of a recursive helper function. By embedding the semantic checking into the pattern, the recursion mechanics are hidden from the user and the intent of the transformation becomes clearer.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

Some of the operators are described using specific forms. For example, the recursive sub-expression operator is designated by >=. Those of ordinary skill in the art will appreciate that other symbols are possible.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for pattern matching and expression transformation of intermediate language expression trees generated by a compiler, the method comprising:

generating an intermediate language expression tree by the compiler;

defining a pattern using a generic pattern definition in a computer program; and responsive to detecting a match statement in the computer program, matching the pattern with an input expression of the intermediate language expression tree, wherein the pattern comprises a recursive sub-expression match; and responsive to detecting a transform statement in the computer program, matching the pattern with an input expression of the intermediate language expression tree, and generating an output expression, wherein the pattern comprises a recursive transform and matching the pattern comprises applying the recursive transformation associated with the recursive transform.

2. The method of claim 1, wherein the match statement includes a generic pattern definition, an input expression, and a compilation unit object, wherein the generic pattern definition is defined using a plurality of objects.

3. The method of claim 2, wherein the generic pattern definition includes a unifiable variable, and wherein the matching step comprises:
   determining if the unifiable variable is bound;
   if the unifiable variable is bound, comparing value of the unifiable variable to a value of the input expression; and
   if the unifiable variable is not bound, binding the unifiable variable to a value of the input expression.

4. The method of claim 3, wherein the matching step further comprises:
   responsive to determining that a bound unifiable variable fails to match the input expression, backtracking to unbind the bound unifiable variable.

5. The method of claim 4, wherein the backtracking step comprises:
   determining an age of the unifiable variable, wherein the age indicates an order of binding;
   comparing the age to a predefined age barrier, wherein the age barrier indicates a point to which an algorithm backtracks; and
   if the age is greater than the age barrier, unbinding the unifiable variable by resetting the value of the unifiable variable.

6. The method of claim 1, wherein the matching and generating step comprise:
   determining if the transform statement includes a derivation pattern, wherein the derivation pattern includes, a derivation operator, a match pattern, and a generate pattern; and
   if the transform statement does not include a derivation pattern, generating a copy of the input expression as an output expression.

7. The method of claim 6, further comprising:
   if the transform statement includes a derivation pattern, matching the input expression with the match pattern along with any grammatical objects; and
   responsive to matching the input expression with the match pattern, generating an output expression for all grammatical objects using the generate pattern.

8. The method of claim 6, wherein the matching and generating step further comprise:
   if the transform statement includes a derivation pattern, generating an output expression from the matched pattern with a plurality of objects, wherein the plurality of objects are bound to the input expression during the matching step.

9. The method of claim 1, wherein the pattern comprises an assignment operator indicating a reference to a part of the pattern, and wherein the matching and generating step comprise:
   responsive to detecting the assignment operator in the pattern, creating a reference for the part of the pattern; and
   responsive to detecting the created reference, referring to the part of the pattern.

10. The method of claim 1, wherein the computer program includes a plurality of patterns defined in a generic pattern definition, wherein the generic pattern definition includes an OR operator for combining the plurality of patterns into a single pattern.

11. The method of claim 1, wherein the computer program includes a plurality of patterns defined in a generic pattern definition, wherein the generic pattern definition includes an AND operator for combining the plurality of patterns into a single pattern.

12. The method of claim 1, wherein the pattern comprises an mFunctor for binding parameters semantically to a function pointer, thereby checking the pattern for semantic properties during matching or generating the output expression based on semantic properties of the pattern.

13. The method of claim 1, wherein the matching and generating step comprise:
   creating a specialized object to accept a set of patterns; and
   programmatically matching the input expression with the set of patterns.

14. The method of claim 1, wherein the computer program is a native program and wherein the native program embeds a plurality of pattern objects, and wherein the plurality of pattern objects are passed as parameters to functions or constructors of the native program.

15. A data processing system for pattern matching and expression transformation of intermediate language expression trees generated by a compiler, the data processing system comprising:
   a processor;
   a memory connected to the processor via a processor bus, wherein the processor is adapted to execute computer implemented instructions in the memory to:
   generate the intermediate language expression trees by the compiler;
   define a pattern using a generic pattern definition in a computer program; and
   match the pattern with an input expression of the intermediate language expression tree responsive to detecting a match statement in the computer program, wherein the pattern comprises a recursive sub-expression match; and
   match the pattern with an input expression of the intermediate language expression tree applying a recursive transformation and generate an output expression, responsive to detecting a transform statement in the computer program, wherein the pattern comprises a recursive transform associated with the recursive transformation.

16. The data processing system of claim 15, wherein the processor is further adapted to execute computer implemented instructions to:
   create a dynamic pattern, wherein the dynamic pattern applies transformation to a set of patterns by:
   create a storage pool object for each pattern in the set of patterns;
   apply transformation to each storage pool object without knowledge of a size of the set of patterns; and
   reuse the storage pool object for future transformations.

17. The data processing system of claim 16, wherein the processor is further adapted to execute computer implemented instructions to:
   pass a plurality of pattern objects embedded within the computer program as parameters to functions or constructors of the computer program.

18. The data processing system of claim 16, wherein the pattern comprises an mFunctor for binding parameters semantically to a function pointer, thereby checking the pattern for semantic properties during matching or generating the output expression based on semantic properties of the pattern.

19. A computer program product in a computer readable recordable-type medium for pattern matching and expression transformation of intermediate language expression trees generated by a compiler, the computer program product comprising:
   instructions for generating the intermediate language expression trees by the compiler;

first instructions for defining a pattern using a generic pattern definition in a computer program;

second instructions for matching the pattern with an input expression of the intermediate language expression tree responsive to detecting a match statement in the computer program, wherein the pattern comprises a recursive sub-expression match; and third instructions for matching the pattern with an input expression of the intermediate language expression tree, and generating an output expression responsive to detecting a transform statement in the computer program, wherein the pattern comprises a recursive transform and said matching comprises applying the recursive transformation associated with the recursive transform.

20. The computer program product of claim 19, further comprising:

fourth instructions for creating a dynamic pattern, wherein the dynamic pattern, applies transformation to a set of patterns embedded within the computer program, and fifth instructions for passing a plurality of objects embedded within the computer program as parameters to functions or constructors of the computer program, wherein the fourth instructions comprise:

first sub-instructions for creating a storage pool object for each pattern in the set of patterns; and second sub-instructions for applying transformation to each storage pool object without knowledge of a size of the set of patterns; and third sub-instructions for reusing the storage pool object for future transformations.

* * * * *